No. 796,527. PATENTED AUG. 8, 1905.
A. U. PATCHEN.
COUPLING FOR FLEXIBLE SHAFTS.
APPLICATION FILED JAN. 18, 1904.
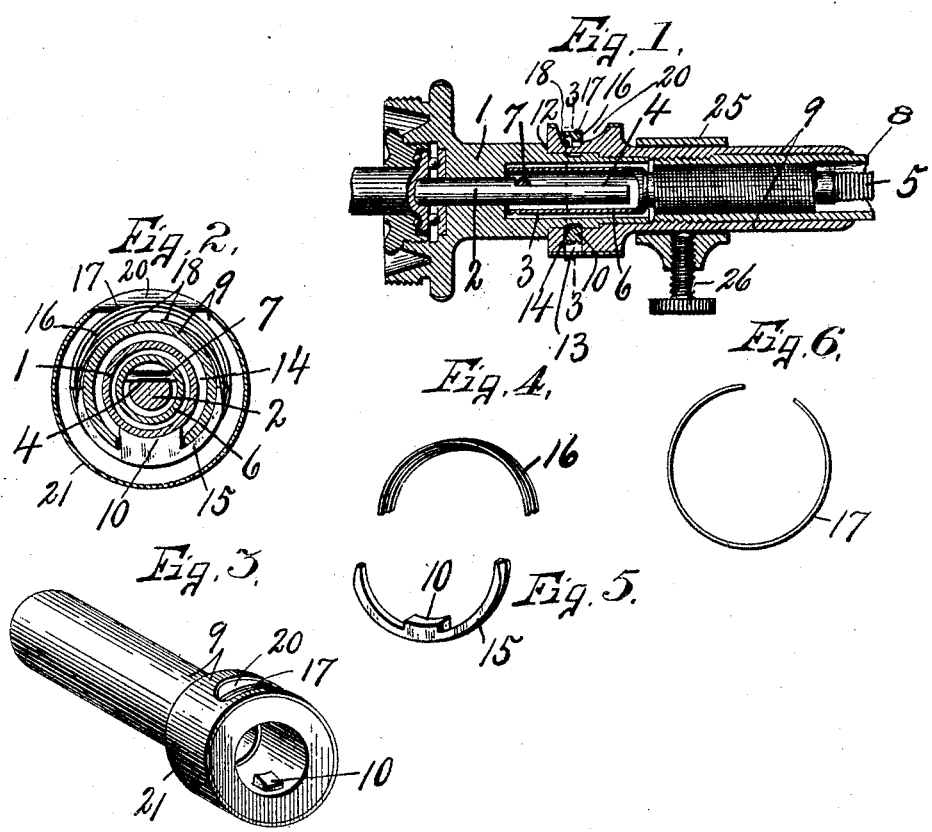
Witnesses:
F. E. Arthur,
H. E. Chase
Inventor:
Alvah U. Patchen
By
Howard P. Denison
Attorney.

UNITED STATES PATENT OFFICE.

ALVAH U. PATCHEN, OF SYRACUSE, NEW YORK.

COUPLING FOR FLEXIBLE SHAFTS.

No. 796,527.        Specification of Letters Patent.        Patented Aug. 8, 1905.

Application filed January 18, 1904. Serial No. 189,613.

*To all whom it may concern:*

Be it known that I, ALVAH U. PATCHEN, of Syracuse, in the county of Onondaga, in the State of New York, have invented new and useful Improvements in Couplings for Flexible Shafts, of which the following, taken in connection with the accompanying drawings, is a full, clear, and exact description.

This invention relates to improvements in couplings for flexible shafts and is particularly applicable for use in connection with massaging implements, dental apparatus, cloth-cutters, and similar devices which are driven from a flexible shaft through a flexible casing and adapted to be tilted at various angles as occasion requires.

My object is to enable the operator to quickly and easily connect or disconnect the shaft and casing sections, either while the driving-shaft is in action or at rest by providing a simple spring-catch which automatically locks the parts from separate endwise movement when they are brought together and may be easily depressed by the finger to permit the parts to be disconnected.

Other objects will appear in the following description.

In the drawings, Figure 1 is a longitudinal sectional view through the coupling and adjacent portions of the parts seen in Fig. 1, which are coupled together. Fig. 2 is a sectional view taken on line 3 3, Fig. 1. Fig. 3 is a perspective view of the head of the casing in which the flexible shaft is movable. Figs. 4 and 5 are perspective views of the semicircular catch-sections for locking the coupling parts together. Fig. 6 is a face view of the spring-ring for holding the catch-sections in operative position.

Similar reference characters indicate corresponding parts in all the views.

In order to clearly demonstrate the practicability of my invention, I have shown a coupling-section 1, which in this instance consists of one head of a massaging implement in which is rotatably mounted a shaft 2, the head 1 being provided with a socket 3, extending inwardly from one end, and the shaft 2 projects into this socket and is formed with a substantially flat keyway 4.

A flexible shaft 5 is provided with a tubular head 6, which receives the flattened end of the shaft 2 and is provided with a key 7, interlocking with and sliding upon the keyway 4 for locking the parts 2 and 5 to rotate together, so that power is transmitted from the flexible driving-shaft 5 to the driven shaft 2 through the medium of the key 7 and interlocking face of the keyway 4. This shaft 5 is surrounded by a flexible casing 8, one end of which is secured in a rigid coupling-head 9, and this coupling-head is detachably secured to the coupling-section 1 by means of a movable catch 10.

The coupling head or section 1 is formed with an annular shoulder 12, which constitutes an abutment to limit the inward movement of the section 9, and is also formed with an annular groove 14 in the periphery of its outer end for receiving the spring-catch 10, which is mounted in and upon the adjacent end of the coupling-section 9 and consists of a tooth or spur formed upon a semicircular ring 15.

The coupling end of the head 9 is provided with an annular groove 13 in its periphery, in which the ring-segment 15, carrying the catch 10, is seated and movable, a portion of the stock at the base of the annular groove being apertured for permitting the catch or tooth 10 to enter the annular groove 14 of the section 1. A similar semicircular ring 16 is seated in the opposite half of the groove in the head 9, with its ends abutting against the adjacent ends of the segment 15, so as to form substantially a complete ring, but of greater interior diameter than the diameter of the groove, so as to permit the ring to be moved radially in one direction to force the tooth 10 out of interlocking engagement with the groove 14 of the section 1. These segments 15 and 16 are held, with their meeting ends together, by a split spring-ring 17, which encircles both ring-segments; but an additional split spring-ring 18 of the same form as the ring 17 encircles and engages the segment 15 and head 9 and fits in the annular groove 13 between the segment 16 and head 9 and serves to normally hold the segment 15 against the periphery of the part 9, with the tooth 10 in the groove 14. It is now apparent that the tooth 10 is yieldingly held in operative position by the spring 18, while the two segments 15 and 16 are held, with their meeting edges together, by the spring 17, and that, owing to the fact that the interior diameter of the complete ring formed by the segments 15 and 16 is greater than the diameter of the base of the groove 13, the spring 18, acting on the segment 15, operates to hold the segment 16 a slight distance away from the adjacent face of the head 9, so that when pressure is brought to bear upon the segment 16 both segments will be moved radially against the action of the spring 18 to disengage the tooth 10 from the groove 14, whereupon the sections 1 and 9 may be separated, and in order to permit this depression the periphery of the coupling ends of the head 9 is cut away at 20, as best seen in Figs. 2, 3, and 4, and the greater portion of the grooves 13 is covered by an exterior cap or shell 21, having an opening therethrough alined with the opening 20, so that access may be had for the finger to depress the section 16 for disengaging the catch 10 from the groove 14.

The advance end of the catch 10 is beveled so as to permit the section 9 to be slipped over and upon the adjacent end of the section 1, and thereby cause the catch 10 to automatically interlock with the groove 14 when the inner end of the head 9 strikes the abutment 12.

I have thus far described the mechanism for detachably connecting the sections 1 and 9, which is substantially the same as that shown in my former application, Serial No. 156,344, filed May 9, 1903, but which was held by the office to be subject-matter for a separate invention and is therefore included in this case.

In the operation of disconnecting the driving-shaft 5 from the driven shaft 2 the operator places his finger in the recess 20 and engages and depresses the segment 16, which in turn engages and depresses the segment 15 sufficient to force the catch 10 out of the groove 14, whereupon the case-sections 1 and 9 may be drawn endwise from each other, and at the same time the key 7 and shaft 2 are also drawn out of engagement with each other, thereby uncoupling both the case-sections 1 and 9 and shaft-sections 2 and 5. In the operation of coupling these parts together the two sections 1 and 9 are taken one in each hand and brought together end to end, so that the part 6 enters the socket 3 and the key 7 rides upon the flat face 4 of the shaft 2, during which operation the beveled face of the catch 10 engages and rides upon the face of the head 1, thereby depressing the segments 15 and 16 against the action of the spring 18, and as soon as the catch 10 is registered with the groove 14 it is automatically forced into said groove 14 by the spring 18 The only function of the spring 17 is to tie the two parts 15 and 16 together and to permit these parts to be easily assembled upon or removed from the part 9 by simply removing the band 21.

Having thus described my invention, what I claim, and desire to secure by Letters Patent, is—

1. A coupling comprising two sections telescoping with each other and each having an annular groove, a ring encircling one of the sections and seated in its groove and having a radial movement, said ring being provided with a catch movable into and out of the groove of the other section as the ring is moved radially for locking and unlocking the sections with each other.

2. A coupling comprising two sections telescoping with each other and each having an annular groove, a ring encircling one of the sections and seated in its groove and having a radial movement, said ring being provided with a catch movable into and out of the groove of the other section as the ring is moved radially for locking and unlocking the sections with each other, and a spring for holding the ring in its locking position.

3. The combination with two coupling-sections telescoping with each other and each provided with a groove in its periphery, of two semicircular segments encircling the outer section and having their end faces abutting against each other, one of the segments having a tooth entering the groove of the outer section and interlocking with the groove of the inner section, and a spring for holding the sections together.

4. The combination with two coupling-sections telescoping with each other and each provided with a groove in its periphery, of two semicircular segments encircling the outer section and having their end faces abutting against each other, one of the segments having a tooth entering the groove of the outer section and interlocking with the groove of the inner section, and a spring for holding the sections together, and a second spring operatively connected to hold the locking-segment in its toothed position.

5. The combination of two case-sections, each inclosing a shaft-section, the shaft-sections having sliding interlocking engagement with each other, and a spring-actuated catch on one of the case-sections engaging and interlocking with the other case-section when said case-sections are brought together.

In witness whereof I have hereunto set my hand this 13th day of January, 1904.

ALVAH U. PATCHEN.

Witnesses:
H. E. CHASE,
B. M. SWITZER.